(12) United States Patent
Cebasek et al.

(10) Patent No.: US 8,481,641 B2
(45) Date of Patent: *Jul. 9, 2013

(54) FLAME AND SMOKE SPREAD RETARDANT MOLDING COMPOUNDS AND COMPONENTS MOLDED FROM THESE COMPOUNDS

(75) Inventors: Thomas J. Cebasek, Conneaut, OH (US); Michael Gruskiewicz, Jefferson, OH (US); Steven T. Searl, Ashtabula, OH (US)

(73) Assignee: Premix Inc., N. Kingsville, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/066,192

(22) Filed: Apr. 8, 2011

(65) Prior Publication Data

US 2011/0195211 A1 Aug. 11, 2011

Related U.S. Application Data

(63) Continuation of application No. 12/217,744, filed on Jul. 8, 2008, now Pat. No. 8,058,324, which is a continuation-in-part of application No. 11/980,275, filed on Oct. 30, 2007.

(51) Int. Cl.

| | |
|---|---|
| *C08G 18/42* | (2006.01) |
| *C08G 18/26* | (2006.01) |
| *C08G 63/60* | (2006.01) |
| *C08F 297/02* | (2006.01) |
| *C08L 33/06* | (2006.01) |
| *C04B 24/26* | (2006.01) |
| *C04B 26/06* | (2006.01) |
| *B60C 1/00* | (2006.01) |
| *C08K 3/18* | (2006.01) |
| *A63B 37/00* | (2006.01) |

(52) U.S. Cl.
USPC ........... 524/605; 524/577; 524/560; 524/563; 524/590; 524/570; 524/437; 524/430; 524/433; 524/604

(58) Field of Classification Search
USPC ................. 524/513, 523, 524, 525, 507, 528, 524/527, 399, 604, 577, 560, 563, 590, 570, 524/437, 430, 433, 605

See application file for complete search history.

(56) References Cited

U.S. PATENT DOCUMENTS 4,160,758 A * 7/1979 Gardner ........................ 523/514

(Continued)

FOREIGN PATENT DOCUMENTS

JP 64 031639 2/1989

(Continued)

OTHER PUBLICATIONS

A. Agnew "Aspects of the use of Aluminium Hydroxide As a Fire Retardant Filler for Polymeric Materials," British Library—The World's Knowledge, pp. 1-4. No Date Available.

(Continued)

*Primary Examiner* — Alexander Kollias
(74) *Attorney, Agent, or Firm* — Hudak, Shunk & Farine Co. LPA

(57) ABSTRACT

HVAC and building and construction components are molded from novel compositions that meet the flame spread and smoke index, and the molding, safety, strength, and aesthetic requirements for this use. In a further embodiment, these compounds also promote better indoor air quality by inhibiting the growth of microbial contaminants within and on the surface of products molded therefrom. These compounds are based on thermoset resin, e.g. a polyester resin which preferably can comprise a polypropylene glycol dicyclopentadiene copolymerized with maleic anhydride, a low profile additive and hydroxy ethyl methacrylate monomer with additional additives including an appropriate catalyst package, a mold release agent, a thickening agent, a loading of aluminum hydroxide which is from about 40 to 65% by weight, having a loading of glass fibers of from about 10 to about 25% and preferably containing a silver ion containing antimicrobial agent, such as soluble glass containing silver ions.

14 Claims, 2 Drawing Sheets

U.S. PATENT DOCUMENTS

| | | | |
|---|---|---|---|
| 4,729,853 A | | 3/1988 | Von Bonin |
| 5,270,357 A | | 12/1993 | Hesse et al. |
| 5,356,953 A | * | 10/1994 | Harada et al. ............... 523/171 |
| 5,414,043 A | * | 5/1995 | Hesse et al. ................... 525/64 |
| 5,447,676 A | * | 9/1995 | Fukuda et al. ........... 264/331.18 |
| 5,783,635 A | * | 7/1998 | Akiyama et al. ............ 525/168 |
| 5,854,317 A | * | 12/1998 | Rinz ............................ 523/508 |
| 6,228,918 B1 | | 5/2001 | Hardebeck |
| 6,365,069 B2 | | 4/2002 | Butler et al. |
| 6,384,151 B1 | * | 5/2002 | Matsukawa et al. .......... 525/445 |
| 7,041,723 B2 | | 5/2006 | Kimura |
| 7,170,038 B2 | | 1/2007 | Butler |
| 2002/0106413 A1 | | 8/2002 | Herbst et al. |
| 2006/0193722 A1 | * | 8/2006 | Butler et al. .................. 415/206 |

FOREIGN PATENT DOCUMENTS

| | | |
|---|---|---|
| JP | 2001 279077 | 10/2001 |
| JP | 2004 263023 | 9/2004 |
| JP | 05 245838 | 9/2011 |

OTHER PUBLICATIONS

"Low Smoke Emission Composite Materials", Aircraft Engineering, (Dec. 1988), pp. 4 and 6.

"Halogen-Free UP Challengers Phenolics in Railways", Reinforced Plastics (Nov. 1995), p. 34-37.

"New Flame Resistant SMC Opens Up Markets", Reinforced Plastics (Nov. 1995), pp. 40-43.

B. Fielitz, B Hudsodordfer and G Montagna, "New Highly Flame Resistant Polyester Moulding Compounds", No Date Available.

Neil Brown, Martinswerk, et al. "New Generation of Fire-Retarded Polyester Composite for Mass Transportation", Composites No. 14 (Mar.-Apr. 1996), pp. 29-38.

Miho Yamaguchi, et al. "Non Halogen/Antimony Flame Retardant System for High End IC Package", Nitta Denko Corporation (1997) pp. 1248-1253.

A. Hernangil et al. "Experimental Design of Fire Retardant Formulations: SMC Low Profile Formulations", Journal of Composite Materials, vol. 32, No. 23/1998, pp. 2120-2155.

Thomas J. Lynch, et al., Reinforced Plastics (Sep. 2003), pp. 44-46 "Advances in ATH Benefit Composite Products".

"Mass transit: New SMC Meets European Fire Requirements", JEC—Composites (Aug.-Sep. 2004), pp. 88-89.

Breakthroughs in SMC for Safe Train Interiors, Reinforced Plastics (Jan. 2005) pp. 34-35.

Martinswerk Technical Newsletter, Date: Jan. 9, 1994 Martinal ON-921—"The Halogen Free Solution for B1/M2 Flame Retardancy" (3 pages).

Michael Sommer, "Flame-Resistant GRP Systems" translated from Kunststoffe 90 (2000) 6, pp. 84-86.

"Schienenfahrzeugseminar BEI-BYK-Chemie in Sesel" Composites No. 19 (Jan.-Feb. 1997), pp. 24-30.

"Menzolit" Data Sheet (Jan. 9, 2004) 1 page.

Martinswerk Technical Newsletter A New Generation of Fire Retarded Polyester Composite for Mass Transportation, 2 pages, Date: Aug. 1995.

Dr. Oliver Turk et al., "Composites Meeting State of the Art Smoke and Fire Requirements", European Alliance for SMC.

"MoldX A (TM) 120 Alumina Trihydrate", Engineered Materials, Revised Jul. 30, 2002, 1 page.

Introducing Mold X (TM) A120, "The Next Generation Flame Retardant for Molding Compounds", hubermaterials, 1 page.

"ASTM E-84 Classification for Kydex Thermoplastic Sheet" Kleerdex Company, LLC, 2007, 4 pages.

"Halogen-Free Composites with Improved Processability", Martinsweek Technical Newsletter (3 pages), Nov. 1997.

Product Information Martinswerk, Martinal ON-4608—ON-310—ON-313—ON-320 presented by dar-tech, Inc. (2 pages), Date: Oct. 1998.

Huber Markets a Variety of Treated and Untreated Alumina Trihydrate (ATH) and Magnesium Hydroxide (MDH) Grades, Huber Engineered Materials websites.

"Ingredients for Fiber Reinforced Plastics (thermosets)" Huber Engineered Materials website.

"Micro-Particle Science, Inorganic Expertise and Process Improvement" MOLD X (TM), hubermaterials.com website.

"IONPURE" brochure-1. Why Inorganic? (pp. 1-39).

STN Search Report, pp. 1-4, Date : Mar. 16, 2011.

Palapreg P 17-02—Product Data Sheet DSM Composite Resins, Jul. 2006, pp. 1-2.

Palapreg H 814-01—Product Data Sheet DSM Composite Resins, Feb. 2010, p. 1.

Palapreg H 852-03—Product Data Sheet DSM Composite Resins, May 2007, p. 1.

Martinal ON-914/ON-921/ON-935, Albemarle, pp. 1-2, Oct. 2007.

European Alliance for SMC , Excellent Flame Retardancy, Sep. 8, 2007, 1 page.

* cited by examiner

FLAME AND SMOKE SPREAD RETARDANT MOLDING COMPOUNDS AND COMPONENTS MOLDED FROM THESE COMPOUNDS

CROSS-REFERENCE

This application is a continuation application of U.S. application Ser. No. 12/217,744, filed Jul. 8, 2008 entitled "Antimicrobial Flame and Smoke Spread Retardant Molding Compounds and Components Molded from These Compounds", which is a continuation-in-part of U.S. application Ser. No. 11/980,275, filed Oct. 30, 2007 entitled "Flame and Smoke Spread Retardant Molding Compounds and Components Molded from These Compounds" which are herein fully incorporated by reference.

FIELD OF INVENTION

The field of invention is molding compounds that are flame and smoke spread retardant, and which in particular meet the standards of UL 723 and comparable tests for other industries. Further these compounds are suitable to be molded into components such as those used in the construction industry. These molded components include, for example, those used in HVAC applications such as housings, drain pans, side walls, for air handling systems, and building applications, such as door skins. A preferable use is in hot air handlers, hot air furnaces and other heating and air conditioning applications ("HVAC"). These compounds are generally liquid thermosetting molding resins typically characterized as sheet molding compositions ("SMC"). They can be used in molding processes such as compression, transfer, and injection/compression. Related compounds may also have uses as bulk molding compositions ("BMC") and thick molding compositions ("TMC®"). In a further embodiment, certain antimicrobial agents are added so that these compounds have a self preservative effect or anti-microbial characteristics so as to affect the quality of air which is in intimate contact with a surface comprised of the compound.

BACKGROUND OF THE INVENTION

Products molded from the composition of this invention desirably have sufficient resistance to fire, flame and smoke spread; adequate glass transition temperatures; antimicrobial characteristics; noise, vibration, and harshness and/or sound dampening properties; and desirable surface characteristics; high and low temperature stability; corrosion and shrink resistance; low odor; and cost. Desirably the compositions include a thermoset resin matrix, such as a modified unsaturated polyester which is preferably the product of a condensation polymerization between a polyol and a di-acid or anhydride. The thermoset resin is, for example, a copolymer of a C2-C16 alkylene glycol and C5-C36 cycloalkylene compound co-polymerized with an anhydride or di-acid. This polymer is subsequently dissolved in a reactive monomer such as styrene, and optionally a C1-C12 OH functionalized acrylate monomer, dimer or trimer may be incorporated into the formulation. The compound most preferably comprises the reaction product of propylene glycol, dicyclopentadiene and maleic anhydride which is dissolved in a blend of styrene. The resin system can further include a low profile resin additive in order to control shrinkage and allow the compound to be molded to specification. The resin system is further blended with a wetting agent, an intiator package, a mold release agent (such as zinc stearate), and with one or more flame retardant additive specifically including aluminum hydroxide, with a thickening agent such as magnesium hydroxide and glass fibers and optionally carbon black or other fillers. In a further embodiment, the compound also includes antimicrobial agents such as silver ion containing compositions or organic anti-microbial agents, and preferably include the silver ion containing compositions, such as silver in glass, (and preferably soluble glass), silver zeolites or silver sodium hydrogen zirconium phosphate.

The composition of the present invention is further formulated to meet the desired molding characteristics; to withstand the operating temperatures to which they will be exposed; and to have a predetermined strength and a desirable user interface including appearance, and noise attenuation, and low odor. These products can be molded in complex geometries for part consolidation while maintaining desirable material characteristics. For example, the products may include mounting brackets for motors and thus need to be self-supporting as well as supporting other components over a broad range of temperatures. Moreover, the product geometries may include large surface areas, sharp angles, projections, recesses, ribs groves, surface texturing, as well as curving shapes of varying cross-sectional thicknesses for example for fluid dynamics or sound attenuation. Typically, the compounds will have a glass transition temperature from about 150° C. (302° F.) to about 175° C. (347° F.).

The molding compositions in accordance with the invention can be formed into articles used in the construction industry, and specifically including the HVAC industry. Advantageously, the antimicrobial compounds of the further embodiment of the invention can be used where indoor air quality is of concern, including, for example, HVAC and refrigeration applications.

In accordance with the present invention, the molded articles have configurations for improving heating and fabrication efficiency and/or economics, including large configurations with flat surfaces and sharp angles or curving lines and further which include integrally molded functional or design elements, such as rims, flanges, bosses, male and female mating parts. Current regulation requires that that minimum flame and smoke retardant properties are met when surface areas exceed a defined square footage. Consequently, the present invention enables the use of molded articles in applications that could formerly only be satisfied through the use of fabricated metal parts. This streamlines, and may eliminate dangerous and costly fabrication steps, such as cutting and welding sheet metal. Moreover, the compositions can be easily modeled based on computer generated models, opening up new possibilities in product design and/or application. These articles can be relatively large and have the mechanical strength, even at elevated temperatures (typically the heater in a residential furnace may operate at temperatures around 540° C., i.e. 1000° F.), to be self-supporting and to support other elements such as the blower housing and/or motor. The invention thus also relates to molded heating and air conditioning cabinets, housings or parts thereof that are used in air handlers and hot air furnaces for residential and commercial buildings. These compounds may also have applications for specialty molded products in the construction industry which require flame and smoke spread retardant characteristics and in particular having large surface area and molded detail including for example entry door skins. Thus, the molded products meet the standards as set forth in UL 723, which relates to fire safety and in particular to the flame and smoke spread which is used to describe the surface burning characteristics of building materials. Analogous tests are set forth in ASTM E-84, UBC8-1 and NFPA 225 which set standards according to the use of the product. UL 723, Class I sets the highest standard since it includes the lowest smoke spread criteria. These tests are also referred to as the "Tunnel Test" (or for ASTM E-84, the "Steiner Tunnel Test"), which measures how far and how fast flames spread across the surface of a test sample and the smoke developed as measured by photoelectric cells. FIG. 3 illustrates the test conditions. In this test, a sample of material 24 inches wide and 25 feet long (and a defined thickness which in this instance is illustrated as 3/16 of an inch) is installed as the ceiling of a test chamber 10 and exposed to a gas flame 12 at one end. The test chamber includes viewing windows 14 and culminates in a smoke exhaust duct 16 that includes a light source 18 and a photo electric cell 20 that is used to measure the smoke developed during testing. The resulting flame spread rating (FSR) is determined visually as the test operator watches the progression of flames down the tunnel and calling off distances which are correlated over time. The flame spread and smoke ratings are individually expressed numbers on a continuous scale in which inorganic reinforced cement board is 0 and red oak is 100. Building codes have established three classes of performance based upon flame spread and smoke developed indices, which are used to specify requirements within the code. Class designations are A or I with a flame spread index of 0-25 feet; B or II with a flame spread index of 26-75; and C or III with a flame spread index of 76-200. For most building codes the smoke developed index is 0-450 but for UL 723 (which includes return air plenums, for example,) has flame spread and smoke developed index of 25 and 50 or less respectively.

Test protocols for antimicrobial activity include ASTM E2180 and JIS Z2801 which respectively utilize test samples bearing a gel and liquid inoculum in a dilute growth medium and a minimum salt medium. ASTM G21 defines a standard method for determining the resistance of synthetic polymeric materials to fungi. This test involves placing test material on a nutrient salt agar plate, spraying the sample with a mixture of fungal spores and incubating the sample. In a further embodiment, the molded products of the present invention meet the applicable requirements set forth in these tests for one or more of the microbial contaminants, which can include viruses, protozoa, bacteria and prions and more specifically for example including *Escherichia coli* NBRC 3972, *Staphylococcus. Aureus* NBRC 12732; and *Aspergillus niger* NBRC6352.

BACKGROUND OF THE INVENTION

Traditionally, many components used in the construction or building industry such as cabinets for residential and commercial air handlers and hot air furnaces have been fabricated from sheet metal, and involve a large box-like design that has changed very little over the past several decades. While there are numerous reasons why a molded composite cabinet would present advantages over the traditional metal ones (including a government mandate in regard to SEER rating that manufacturers improve the efficiency of air handling equipment), the industry has not been able to pursue this idea commercially. First, there is significant legislation covering fire and flame spread criteria for the building and construction industry. For example, many jurisdictions require compliance with standard classifications such as Underwriters Laboratory ("UL") test 723 (also known as 25/50 flame spread/smoke index) when there is more than 10 square feet surface area of non-metallic material utilized in the air flow stream of air conditioning and furnace products having ignition sources. The use of thermoset composite drain pans and blower housings approach in most, and in some instances, exceeds 10 square feet of surface area. Thus, the development of a composite material that complies with UL 723 has long been an unrequited goal of the construction and building industry and its suppliers.

In accordance with the present invention, a composite material is provided that meets this standard (as well as the standards of UBC8-1, NFPA 225, and ASTM E-84, BS 6853, DIN 5510 and NF F 16-101/102). Moreover, the development of a thermoset composite material that complies with UL 723 provides for significant new products for use in furnace and air conditioning as well as for other construction and transportation applications which require a similar degree of flame and/or smoke spread retardancy. In a further embodiment, the composite material had improved long term stability as it avoids degradation due to microbial activity and may even provide Indoor Air Quality benefits as it may also meet the requirements of one or more of JIS (Japan Industry Standard) Z 2801, ASTM E2180, and ASTM G21.

A second advantage provided by the present invention has to do with sound characteristics. While there are often legislative mandates relating to flame and smoke spread for building and construction applications, there are generally fewer government restrictions relating to noise or sound. It is nonetheless a significant advantage commercially to address these characteristics as the consumer will generally select a product with lower noise emissions. As an example, an air handler or furnace cabinet is often a relatively large hollow box that can actually act to amplify motor sounds, if not sufficiently dampened for sound transmission. Thus, in addition to the government mandated issues relating to fire/flame spread, it is further advantageous if the components help to meet the consumers' demand for quiet home heating and air conditioning. The present invention may also be used to help to improve air quality. The thermoset composite of the present invention helps to further these goals by presenting improved sound dampening ability over the prior art sheet metal components.

Molded polymeric components including for example housings or cabinets or components thereof, present many additional advantages over the prior art metal components. They significantly reduce the potential for injury during assembly by eliminating the need for high temperature welding operations, and for cutting and bending sheet metal. They greatly increase the efficiency of assembly by providing the opportunity for consolidation of components for example, by providing integrally molded functional elements, such as mating elements and/or mounting flanges. Thus, molded polymeric housings have been in use for a significant period of time for blowers for air conditioners, and in particular room air conditioners. In addition, they have been used for small scale heating blowers subjected to relatively low temperatures, such as hair dryers. These applications often involve the use of very expensive compositions, which can be used since the size is small and they are not required to meet the flame spread smoke index retardancy previously discussed. Other hot air furnace components, such as the condensate pan, have been made of molded resins for some time.

However, despite the use of molded polymerics for these other applications and for housings in window air conditioners for well over 30 years, the HVAC industry has failed to capitalize on the many advantages that could be realized through the use of large molded polymeric components for hot air furnaces, air handlers and air conditioning units. There are several reasons to account for the prior art practice, including the belief that the blower environment is better suited for metal, which has proven longevity and noted fire resistance. An additional problem is the lack of understanding in the compounding industry of how to achieve sufficient structural reinforcement, such as through the use of glass fiber reinforcement, while maintaining proper flame and smoke properties for this application. Finally, despite the long recognized advantages and economic incentives, the prior art has failed to produce an acceptable composite material that meets the fire, smoke, and flame spread criteria as set forth in UL 723 Class I and that is moldable in complex shapes with an acceptable appearance.

The present invention provides the solution to the previously mentioned issues, while also presenting a platform for improved efficiencies in the HVAC industry. The present invention provides a molded composite cabinet or cabinet components for hot air furnaces, air handlers and/or air conditioning units. This cabinet may include integral molded functional parts, such as mating elements, and mounting flanges. It has the desired mechanical properties including tensile and impact properties at the necessary operating temperature range. It can be molded into complex configurations and surface characteristics. It does this while maintaining quiet and safe operating conditions.

In addition to the regulations relating to the smoke and flame characteristics of the present invention, there is pending legislation and political posturing regarding the issue of Indoor Air Quality (IAQ). This debate centers around a growing awareness and concern with "sick building syndrome" in which residential and commercial buildings are constructed to conserve energy by sealing the building and relying on central cooling and heating systems to maintain comfortable living temperatures and humidity by re-circulating internal air (and pollutants). Various factors influence the quality of the indoor air, including for example, the supply and quality of the ambient outside air; contamination of indoor air from building materials, carbon monoxide, tobacco smoke, fabric furnishings, carpet adhesives, paint fumes and cleaning products, as well as microbial contamination of ventilation systems or building interiors. The present invention provides an additional method of achieving compliance with existing or proposed regulations by inhibiting or even reducing microbial growth within an HVAC or other construction surface.

SUMMARY OF THE INVENTION

The present invention provides hot air furnace/air handler blower housings which are molded from compositions that meet the molding, safety, strength, and aesthetic requirements for this use. These compounds are typically liquid thermoset resins with a specific level of flame retardant and reinforcement additives to achieve the required safety and desired sound dampening, and in a further specific embodiment, the antimicrobial characteristics, for this article without sacrificing molding characteristics. Additional additives include initiators and molding agents to permit the compositions to be molded into the desired shape by a variety of types of molding processes. Optimally, the base resin can include a polyester resin and more specifically is a thermoset resin matrix such as a modified unsaturated polyester which is preferably the product of a condensation polymerization of a polyol. Most preferably the resin can be the reaction product of polypropylene glycol dicyclopentadiene and maleic anhydride which is subsequently dissolved in styrene. The system can further include a saturated polyester low profile additive and hydroxy ethyl methacrylate monomer with additional additives including an appropriate catalyst package, a mold release agent, a thickening agent, a loading of aluminum hydroxide which is from about 40 to 65% by weight, and more preferably from about 45 to about 60% by weight, and most preferably from about 52 to about 58%, and having a loading of glass fibers of from about 5 to about 40%, and preferably from about 10 to about 25%.

In particular, the formulations involve the use of a resin matrix with significant loadings of flame retardant and glass filler; various additional additives, such as initiators, inhibitors, mold-release agents, shrink control additives, viscosity agents, flow modifiers, thickeners, styrene, and carbon black or pigments or other desirable additives, specifically including antimicrobial agents in a further embodiment of the invention.

The foregoing improvements in articles molded from these compositions enable the low cost mass production of cabinets, drain pans, housings and other components used in hot air furnaces/air handlers, air conditioners, ventilation and refrigeration systems and other HVAC and air handling and air transport surfaces. These improvements further allow for the far greater flexibility in component design in order to meet the mandate of improved unit efficiency, and improved air quality and also permit the combination of functions in a single article so as to permit greater fabrication efficiency, lower cost and a smaller unit foot print.

DETAILED DESCRIPTION OF THE INVENTION

Figure 1:
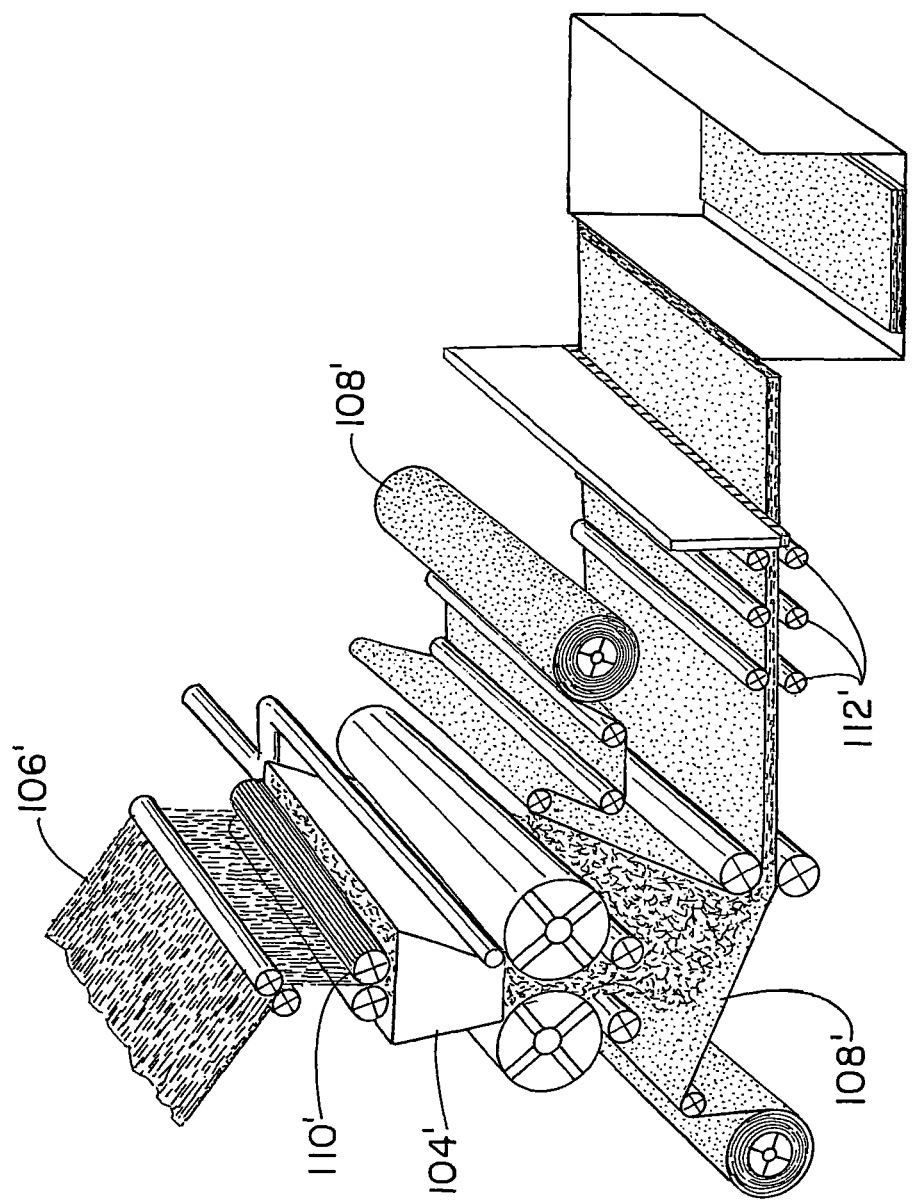
FIG. 1 is an illustration of a Thick Molding Compound Machine.

The invention relates to composite resins having the required flame, fire and smoke spread characteristics for use in the HVAC industry. In a further embodiment of the invention, the composite resins further include antimicrobial agents so as to meet industry standards to inhibit the growth of one or more microbial contaminants. The invention further relates to components used in air handlers and hot air furnaces and in particular HVAC or other air quality control components made from these composite resins. These resins can be used in injection molding processes, in transfer molding processes, in compression molding processes, and in injection/compression molding processes to make the air handling components. These processes are cost effective because they eliminate labor intensive machining and fabrication. The processes further have better ability to control shot to shot cross parting line thickness. Further these molding processes enable the production of complex configurations that have integral functional features and that have significant concentrations of fillers including fiber reinforcement and flame retardants.

One component of the molding resin composition is a cross linkable unsaturated polyester resin that is the reaction production of a condensation polymerization of a polyol including one or more of the following polyols: ethylene glycol, propylene glycol, neopentyl glycol, diethylene glycol, dipropylene glycol, trimethylpentanediol, cyclohexane diol, propoxylated bisphenol A, hydrogenated bisphenol A, and blends thereof. These polyols are polymerized with an acids or anhydride including one or more of the following as well as dimers and blends thereof: phthalic anhydride, maleic anhydride, adipic acid, isophthalic acid, orthophthalic acid, terephthalic acid, fumaric acid, glutaric acid, azelaic acid, and endomethylenetetrahydrophthalic anhydride. These are optionally cross-linked (during molding) with a low profile additive which can include one or more of the following polymethylmethacrylate, polyethylmethacrylate, co-polymers with other acrylates, polystyrene, polystyrene copolymers, polyvinyl acetate, polyethylene, saturated polyesters, and shrinkage control agents. The saturated polyesters and shrinkage control agents include vinyl chloride-vinyl acetate copolymers, polyurethanes, styrene butadiene copolymers, polycaprolactone, and cellulose acetate butyrate. The low profile additives can be added directly to the formulation or they can be applied or incorporated onto a carrier material such as a filler. The molding compound can be reinforced with, for example, fiber glass, aramid fibers, carbon fibers, or mineral reinforcements such as mica. In addition nano-fibers and nano-fillers can be added. Other polymer materials that can be used include bulk (or dough) molding compound, kneading molding compound, an injection molding compound known as ZMC, and thick molding compound.

Desirably the prepolymer has a relatively low molecular weight such as from about 200 to about 5000 (weight average) and a glass transition temperature from about 150° C. (302° F.) to about 175° C. (347° F.). The polyester resins are the condensation product derived from the condensation of unsaturated polybasic acids and/or anhydrides with polyols such as dihydroxy or trihydroxy compounds. Desirably, these polyester resins are the esterification reaction product of diacids, or anhydrides of diacids, generally having from about 3 to about 12, or more preferably from about 4 to about 8 carbon atoms, with a polyol or a cyclic ether having from about 2 to about 12, or more preferably from about 2 to about 6 carbon atoms.

For some applications a vinyl ester can be used in addition to a previously described polyester or even as the resin. In this case, the vinyl ester resins that can be used are the reaction products of epoxy resins and a monofunctional ethlenically unsaturated carboxylic acid. More specifically, these vinyl ester resins are the reaction product of an epoxy terminated oligomer, for example, an epoxy functionalized bisphenol A with an acrylic acid, or methacrylic acid forming acrylic terminal groups on the oligomer. The vinyl esters have predominantly terminal unsaturation while the unsaturated polyesters have predominantly internal unsaturation.

Another component of the molding composition is one or more unsaturated monomer that is copolymerizable with the resin. Desirably, this component is capable of dissolving the resin component at room temperature. Thus, in one embodiment the resin is dissolved in the monomeric component prior to being combined with the remaining components. Examples of suitable monomers are styrene, alpha-methyl styrene, vinyl toluene, divinyl benzene, diallylphthalate, hydroxy ethyl methacrylate, methyl methacrylate, and mixture of these, with preferred monomers being styrene, hydroxy ethyl methacrylate, and methyl methacrylate, and most preferably styrene. The ratio of monomer(s) to resin is desirably from about 5:95 to about 50:50 and preferably from about 10:90 to about 25:75 by weight.

Another component in the molding composition is fillers. In accordance with the invention the predominant filler is flame retardant filler. The preferred flame retardant filler is a loading of aluminum hydroxide, which is from about 40 to 65% by weight, and more preferably from about 45 to about 60% by weight, and most preferably from about 52 to about 58%. These loadings can also be expressed as parts per hundred resin wherein the weight of the resin includes the basic resin, any low profile additive, and the monomer. These amounts range from about 250 to about 400 parts per hundred "pph" resin to preferably from about 275 to about 350 pph, and most preferably from about 300 to about 325 pph. In addition reinforcing filler is added in order to impart structural properties and sound dampening to the final molded product. A preferred filler is glass fibers and fibrous reinforcing agents such as cotton glass fibers or graphite microfibers; The fibers may comprise chopped sized glass microfiber rovings at an amount below 25% for sound dampening, and preferably from about 10 to about 25%, and more preferably from about 15 to about 22%, and most preferably about 18 to about 24% in particular for the blower housing having a loading of 22%. The fibers are from about ⅛ to about ½ inch for BMC, to about ¼ to about 2 inches for SMC, and from about ¼ to about 1 inch for TMC.

An initiator is another component of the molding composition. The initiator initiates the copolymerization of the resin and the monomer(s). Initiators include any free radical initiator capable of forming radicals in the correct concentration under the molding conditions. They may include peroxides, hydroperoxides, redox systems, diazo compounds, persulfates, perbenzoates. The initiators are typically used in amounts of about 0.05 to about 5 weight percent, and more preferably about 0.1 to about 2 weight percent. Alternatively, these amount can be expressed in parts per hundred parts by weight of resin, i.e. from about 0.5 to about 4.0 phr, preferably from about 0.7 to about 3.0 phr, and most preferably from about 0.8 to about 2.25 phr. Alternatively high temperature initiators such as Di-cup, e.g. dicumyl peroxide can be used for molding applications where higher initiation temperatures are desirable. Peroxy Ester and Perketal initiators are preferred. Inhibitors can also be added to the catalyst package, such as toluhydroquinone and diethylene glycol.

The inclusion of 0.5 to 10 phr, preferably about 1 to 8 phr, of a mold release agent, such as Tech-lube HV706, calcium stearate, zinc stearate such as NORAC COAD 27D, or the like may also be of advantage to achieving without machining the complex molded part of the present invention. Tech-lube HV706 is proprietary composition of fatty acids, glycerides, polymeric resin and phosphate surfactant sold by Tech-nick Products of New Jersey. A viscosity reducer can be used in combination with styrene to maintain the molding properties, and to decrease the cost of the composition.

Another optional component to the improved molding composition is a rheological modifier or thickener, which may act to increase the molecular weight such as by chain extension of the resin prepolymer. Suitable modifiers include Group II oxides and hydroxides, such as calcium or magnesium oxide or hydroxide. These modifiers may act to increase shear and thus promote flow and glass carry in the composition during molding. Fumed silica is an example of an additional substance, which may act mechanically to increase molding viscosity and therefore also be a suitable rheological modifier either alone or in combination with the previously mentioned ingredients. Magnesium oxide is a preferred thickener to achieve suitable molding characteristics for SMC.

Desirably the rheological modifiers are used in an effective amount to enhance molding properties, such as thickening the resin system prior to molding. Desirable amounts of group II oxides (including group II hydroxides and mixtures of these compounds) is from about 0.1 to about 1 or about 2 weight percent, more desirably from about 0.2 or about 0.3 to about 0.7 or about 0.8 weight percent. This can also be expressed as from about 0.5 to about 4.0 phr, preferably from about 1.0 to about 3.0 phr, and most preferably from about 1.5 to about 2.5 phr. Specific preferred compounds include magnesium oxide, or magnesium hydroxide or calcium oxide. Examples of suitable magnesium oxide additives are 99% pure magnesium oxide sold under the trade name "Elastomag" from Morton Thiokol, Inc. in Danvers, Mass. Other examples include a magnesium oxide dispersion sold under the trade name "PG-9033" by Plasticolors, and a magnesium hydroxide dispersion also sold by Plasticolors under the trade name "PG-91146". Another suitable magnesium hydroxide is from Barcroft, which is a powdered version. Fumed silica could be used at from about 0.5 to about 20 phr, preferably from about 1 to 10 phr.

Other components to the molding composition include flame retardants such as aluminum hydroxide for example sold by Albemarle Corporation under the trade name ON-921, which has a sieve residue of greater than 40% at 45 µm or Moldex A120 sold by Huber, with the ON-921 being preferred. The preferred flame retardant filler is a loading of aluminum hydroxide which is from about 40 to 65% by weight, and more preferably from about 45 to about 60% by weight, and most preferably from about 52 to about 58%.

The composition may also include flexibilizing agents; mold release agents; polymerization inhibitors to inhibit premature polymerization during storage or the initial stages of molding; viscosity modifiers like fumed silica; and mold lubricant like stearates of calcium, zinc or magnesium.

In addition, shrink control additives can advantageously be added to improve the surface characteristics and the dimensional stability of the resulting products. These shrink control additives include "anti-shrink" and "low profile additives" as part of this aspect of the invention. These additives generally include thermoplastics or elastomerics such as homopolymers of ethylene, styrene, vinyl toluene, alkyl methacrylates, polyethylene ether, polyphenylene oxide and alkyl acrylates. Additional examples include copolymers using the foregoing and in addition, vinyl chloride, vinyl acetate, acrylonitrile, and butadiene. In particular these co-polymers would advantageously include copolymers of vinyl chloride and vinyl acetate; styrene and acrylonitrile; methyl methacrylate and alkyl esters of acrylic acid; methyl methacrylate and styrene; methyl methacrylate and acrylamide; and SBS block copolymers. Particularly advantageous additives are thermoplastics, with saturated polyesters being preferred among these. These additives are generally used in the range of 10 to 50 weight percent based on the total weight of the additive and the resin system, i.e. the resin and any monomers. More preferably this range would be 20 to 45 weight percent, with a particularly preferred range of about 30 to 40 weight percent. These additives are usually added with the resin blending. As necessary the cure system may be adjusted to compensate for the presence of the additive.

Suitable initiators include Vazo (2,2-azo bisisobutyronitrile) available from Dupont, I & B Industrial and Biochemical Dept, Wilmington Del., tert-butyl peroxy isopropyl carbonate (Triginox BPIC) available from Durr Marketing in Pittsburgh, Pa., t-butylperbenzoate (TBPB) available from Durr Marketing, and 1,3 di-t-butyl peroxy-3,5,5 trimethylcyclohexane catalyst (Trig 29B75) available from Durr Marketing.

Calcium stearate and zinc stearate sold as COAD 27 by the Norac Company, Incorporated of Azusa, Calif. can be used as mold release agents, as can Tech-Lube HV-706, which is a proprietary composition of fatty acids, glycerides, polymeric resin and phosphate surfactant.

In a further embodiment of the invention, the molding compositions include at least a sufficient quantity of an antimicrobial agent to provide improved product life by inhibiting degradation due to microbial affect. More preferably, sufficient quantity of an appropriate agent is included to provide for improved external benefits, such as improved air quality for molded components for air handling or refrigeration or for transportation of potable water or food products. Suitable antimicrobial agents include organic and metal containing compositions, such as triclosan, zinc omadine, and various silver containing additives, such as silver sodium hydrogen zirconium phosphate, silver zeolite, and glass/silver combinations, such as microspheres, nanospheres or nanotubes, and soluble glass and silver ion combinations. In accordance with the invention, silver ion containing antimicrobials are preferred, and specifically include inorganic silver glass products such as is sold under the tradename "IONPURE" by Ishizuka Glass Co. LTD., of Nagoya Japan. Other acceptable products include silver ion containing zeolite and inorganic silver glass sold by CIBhA Corporation under the tradename "IRAGUARD", by AGiON Technologies under to tradename "AGION", by Milliken Chemicals under the tradename "ALPHSAN", by Clariant Chemicals under the tradename "A21-60", by Astoria under the tradename "IPF". Suitable organic antimicrobial product include Rohm & Haas products sold under the tradename "VINYZENE" Suitable amounts depend somewhat on the desired affect and the target microorganism, but generally range from 0.0001% to 5%, and more preferably from 0.001% to 3% by weight, and most preferably from 0.01 to 2% by weight of the total system. In the event that target microbes include those that are harder to eradicate, higher concentrations of antimicrobials are necessary (such as for the case of *Bacillus* sp. and *Aspergillus niger* NBRC6352 for which a 2% solution of silver glass has been shown to be 93% effective in accordance with one of the accepted industry test protocols. Otherwise, for microbes including for example, including *Escherichia coli* NBRC 3972, *Staphylococcus. Aureus* NBRC 12732 can be controlled at 0.3% of IONPURE in a test sample when tested according to JIS Z 2801. Microbes to be controlled include for example, gram positive bacteria such as *Staphylococcus, Enterococcus, Streptococcus*, and *Bacillus*; gram negative bacteria such as *Pseudomonas, Klebsiella, E Coli*, and *Salmonella*; Fungi, such as *Aspergillis, Candida, Cladosporium*, and *Penicillium*.

Figure 2:
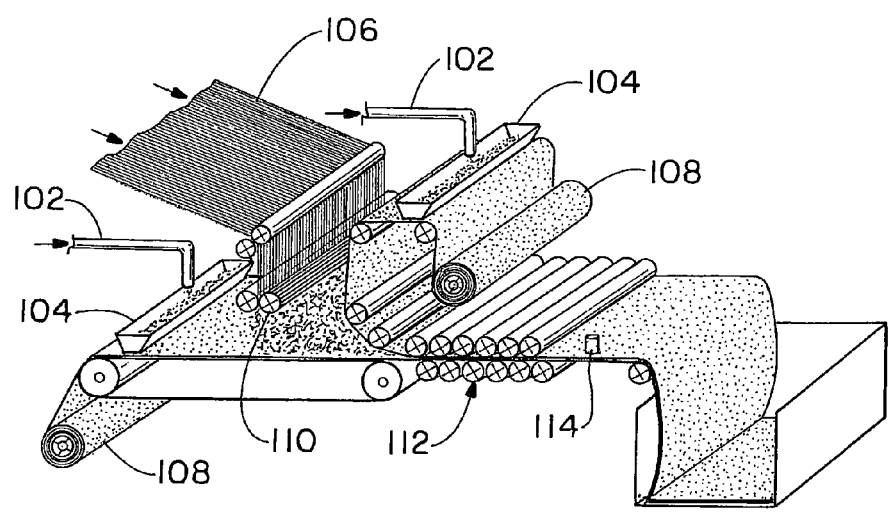
FIG. 2 is an illustration of a Sheet Molding Compound Machine.
Figure 3:
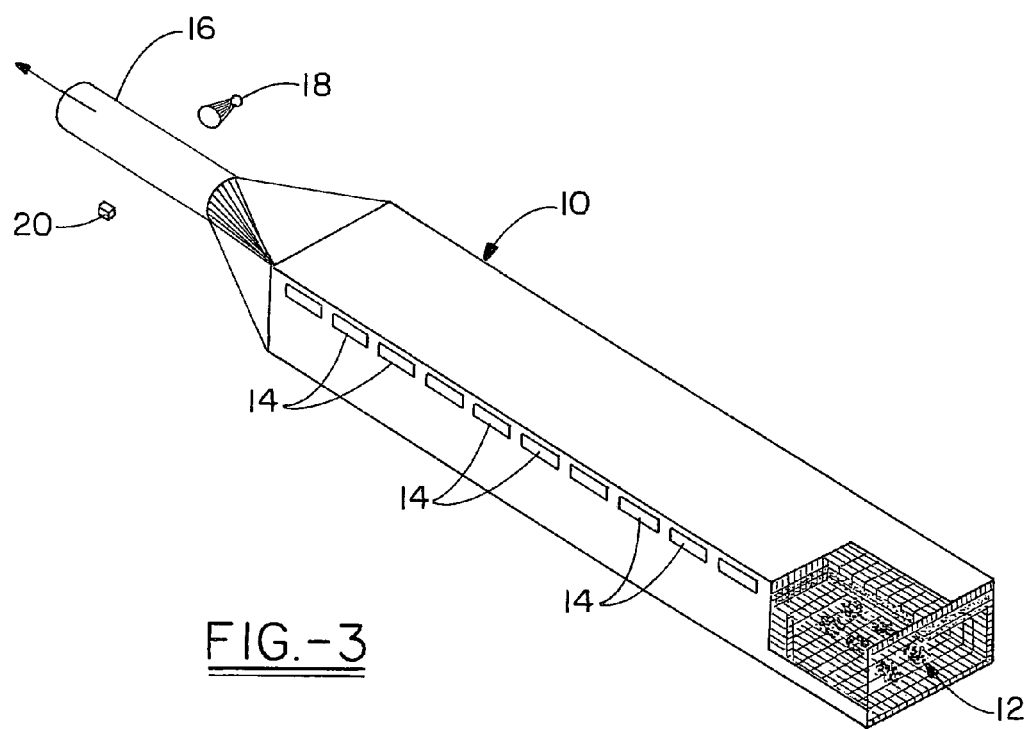
FIG. 3 is an illustration of the test set-up for a Steiner Tunnel Test.

The molding compositions may be formulated and mixed using a variety of mixing conditions including either continuous or batch and using a variety of known mixing equipment. Specific examples are set forth in the example section. FIGS. 1 and 2 illustrate SMC and TMC Machines that receive glass rovings that are chopped and impregnated with a paste of the resin system and compacted between two layers of a carrier film. The compositions may be advantageously stored for reasonable times before molding. The compositions can be molded by a variety of methods including compression, transfer, and injection molding or combinations of theses techniques. The compositions can be molded under typical conditions for these types of molding including at pressures from about 400 to about 9000 psi, and preferably from about 2000 to about 3500 psi, and most preferably from about 2500 to about 3000 psi and temperatures at from about 225 to about 400 degrees Fahrenheit. Dwell times are from about 10 seconds to about four minutes. Advantageously, silver glass antimicrobial agents, such as the IONPURE, are added from a masterbatch produced with from about 5% to about 50%, and more preferably about 10% to about 30% IONPURE in the resin which is diluted in the ultimate resin system.

Otherwise conventional injection molding techniques apply as is discussed for example in U.S. Patent No. 6,365,069 B2 incorporated by reference herein. It is preferable to avoid temperature variations at the mold level. At normal cure rates, the dwell time for injection molding is typically around 5 to 600 seconds, or more usually 30 to 300 seconds or around one or two minutes. The process can be practiced for single or double gate cavity tools, or even for injection/compression processes in which the mold is slightly opened during fill and the mold is shut to compress the shot.

The articles from the composition desirably have tensile strength from about 2000 to about 6000 psi as measured in accordance with ASTM test No. D638 and flexural modulus from about 3000 to about 10,000 psi when tested in accordance with ASTM test no. D790.

Molded products made from the compositions of the present invention are useful for a variety of applications demanding complex configurations, as well as strength, and corrosion resistance. One particularly advantageous product, which can be made by compression molding, is a blower housing. The housing is typically molded in two parts and fitted together.

Examples

Resin A is S903 styrene solution of an unsaturated polyester resin based on propylene glycol and dicyclopentadiene and maleic anhydride sold by AOC.

Resin B is a low profile additive resin formulated for use in SMC applications sold by Ashland Chemical under the designation Q8000.

Resin C is a styrene solution of an unsaturated polyester resin based on propylene glycol and maleic anhydride sold by Reichhold Chemicals under the designation 31-615-20.

Resin D is a styrene solution of an unsaturated polyester resin sold by Reichhold Chemicals under the designation 31009.

Resin E is a styrene solution of an unsaturated polyester resin which also contains a soluble low profile additive system which is sold by AOC under the designation S988-500.

Resin F is a styrene solution of an unsaturated polyester resin sold by Reichhold Chemicals under the designation 31610.

Monomer A is a hydroxyethyl methacrylate monomer sold by Rohm & Hass under the designation ROCRYL 400.

Low profile additive A is FN-510, a linear low-density polyethylene from Equistar Chemicals, L.P. of Houston, Tex.

Low profile additive B is N 700 is a styrene solution of PMMA which is a non-reactive additive for minimizing shrinkage during cure of polyester resins sold by AOC.

R 100 is a high impact polystyrene from Chevron in styrene solution. These ingredients are added together to comprise the base resin for 100 phr.

Flame retardant A is Antiblaze DMMP. A high phosphorus content additive flame retardant sold by Akzo Nobel under the tradename, FYROL.

Flame retardant B is ON-921 aluminium hydroxide from Hueber, and similarly SB 222 and SB 432 are alumina trihydrate flame retardants from Hueber.

Dispersing agent A is BYK-W-996 anionic setting and dispersing additive sold by Dar-Tech.

Initiator A is Trigonox BPIC-C75 Tert-butyl peroxy isopropyl carbonate from Durr Marketing in Pittsburgh, Pa.

Initiator B is Trigonox 210P50 an alkylperoxyester (tert-Butyl peroxy-2-ethylhexanoate available from Durr Marketing in Pittsburgh, Pa.

Inhibitor A is IN-9073 is Toluhydroquinone in Diethylene Glycol from Plasticolors.

Inhibitor B is In 91029 is an inhibitor solution of 2,6,-di-tert-butyl-p-cresol in vinyl toluene sold by Plasticolors.

Inhibitor C is IN-9139 is a BPQ inhibitor solution from Plasticolors.

Mold release agent A is Zinc stearate COAD 27D from Norac Company.

Colorant A is a grey colorant containing carbon black, titanium dioxide, toner pigments, a saturated polyester resin sold by Ferro-PDI under the designation 11-81521.

Thickener A is PG-91146 is a magnesium hydroxide dispersion from Plasticolors.

Thickener B is AM 9033, a neutral accumag thickener from Plasticolors.

Rheological Additive A is Garamite 1210, a rheological additive for vinyl ester and unsaturated polyester resins from Rockwood Additives.

Glass fibers used is Owens Corning P-973C-AB-113 or 5509 (10-20 micron) continuous strand glass roving with silane sizing The molding compositions are generally prepared by adding the resin, monomer, initiator, inhibitor, mold release agent, and rheological modifier (if present) to a high shear cowls disperser to form a paste. The paste is then applied to two carrier films to form a sandwich layer with the glass fibers in the middle. The paste viscosity is in the range of 10,000 to 40,000 cps, with the paste temperatures in the range of 38° C. to 49° C. The compound is allowed to thicken or mature, normally 2 to 5 days the to reach a viscosity of about $20 \times 10^6$ to about $30 \times 10^6$ cps. FIG. 1 illustrates a TMC® machine which is suitable for use in compounding the material in accordance with the present invention. In particular, paste is transferred into a doctor box 104' along with glass rovings 106' which are fed through chopper blades 110' along with the paste and subsequently sandwiched between two layers of carrier film 108'. This is compacted between compaction rollers 112'. FIG. 2 illustrates an SMC machine in which paste 102 is transferred into SMC machine doctor boxes 104 along with glass rovings 106 which are fed through chopper blades 110 along with the paste and subsequently sandwiched between two layers of carrier film 108. This is compacted between compaction rollers 112 and monitored with a gamma gauge 114 in order to produce the desired thickness of product.

After maturing the compound can be molded in a number of various methods compression molding, injection molding, injection compression molding, and transfer molding. Molding temperatures can vary from 140° C. to 160° C. and molding dwell times can be from 1 to 6 minutes. Molding pressures can vary from 500 psi to 3000 psi.

Tables 1 through 6 set forth recipes of compositions in accordance with the present invention which were tested for molding into furnace housings. Ingredients are listed in parts per hundred of resin (PHR). Tables 7 and 8 set forth recipes of composition in accordance with a further embodiment of the invention that have antimicrobial properties and can be molded into products including for example drain pans and air handling components.

TABLE 1

|  | Example | | | |
| --- | --- | --- | --- | --- |
|  | 1 | 2 | 3 | 4 |
| Resin A (S903) | 76.30 | 76.30 | 78.40 | 61.10 |
| Low profile additive (R-152) |  | 15.80 |  | 33.30 |
| Resin B (Q-8000) | 15.80 |  | 16.20 |  |
| Monomer A (ROCRYL 400 [HEMA]) |  | 7.90 | 5.40 | 5.60 |
| Dispersing agent A (BYK-W-996) | 4.20 | 4.20 | 4.30 | 4.40 |
| Flame retardant A |  |  | 8.10 | 5.60 |

TABLE 1-continued

| | Example | | | |
|---|---|---|---|---|
| | 1 | 2 | 3 | 4 |
| (Antiblaze DMMP) | | | | |
| Initiator A (TRIG. BPIC-C75) | 1.10 | 1.10 | 1.10 | 1.10 |
| Initiator B (TRIG.21OP50) | 0.40 | 0.40 | 0.40 | 0.40 |
| Inhibitor A (IN-9073) | 0.20 | 0.20 | 0.20 | 0.20 |
| Mold release agent A (NORAC COAD 27D ZNST) | 5.30 | 5.30 | 5.40 | 5.60 |
| Colorant A (11-81521 [Grey]) | 7.90 | 7.90 | 8.10 | 8.30 |
| Flame retardant B (Martinal ON-921 ATH Albemarle) | 289.00 | 289.00 | 289.001 | 302.00 |
| Solid glass spheres (3000 CP-01 SPHERIGLASS) | | | | |
| Thickener A (PG-91146) | | | 4.30 | 5.60 |
| Thickener B (AM-9033) | 2.63 | 2.63 | | |
| Glass fibers (P-973CAB-113) | 115.70 | 115.70 | 118.90 | 122.20 |
| Total | 526.43 | 526.43 | 539.80 | 555.40 |

TABLE 2

| | Example | | | |
|---|---|---|---|---|
| | 5 | 6 | 7 | 8 |
| Resin A (S903) | 59.20 | | 61.10 | 60.30 |
| Resin C (31-615-20-X) | | 59.20 | | |
| Styrene monomer (R-152) | | | | |
| Resin B (Q-8000) | 32.90 | 32.90 | 33.30 | 33.80 |
| Monomer A (ROCRYL 400 [HEMA]) | 7.90 | 7.90 | 5.60 | 5.90 |
| Dispersing agent A (BYK-W-996) | 4.20 | 4.20 | 4.40 | 4.70 |
| Flame retardant A (Antiblaze DMMP) | | | 5.60 | 5.90 |
| Initiator A (TRIG. BPIC-C75) | 1.10 | 1.10 | 1.10 | 1.18 |
| Initiator B (TRIG.21OP50) | 0.40 | 0.40 | 0.40 | 0.40 |
| Inhibitor A (IN-9073) | 0.20 | 0.20 | 0.20 | 0.20 |
| Mold release agent A (NORAC COAD 27D ZNST) | 5.30 | 5.30 | 5.60 | 5.90 |
| Colorant A (11-81521 [Grey]) | 7.90 | 7.90 | 8.30 | 8.80 |
| Flame retardant B (Martinal ON-921 ATH Albemarle) | 290.00 | 290.00 | 302.00 | 313.00 |
| Solid glass spheres 3000 CP-01 SPHERIGLASS | | | | 11.80 |
| Thickener A (PG-91146) | | | 5.60 | 7.10 |
| Thickener B (AM-9033) | 1.84 | 1.84 | | |
| Glass fibers (P-973CAB-113) | 115.80 | 115.80 | 122.20 | 129.40 |
| Total | 526.74 | 526.74 | 555.40 | 588.38 |

TABLE 3

| | Example | | | |
|---|---|---|---|---|
| | 9 | 10 | 11 | 12 |
| Resin A (S903) | 54.40 | 61.10 | 56.50 | 55.20 |
| Resin C (31-615-20-X) | | | | |
| Styrene Monomer (R-152) | | | | |
| Resin B (Q-8000) | 40.00 | 33.30 | 37.70 | 38.80 |
| Monomer A (ROCRYL 400 [HEMA]) | 5.60 | 5.60 | 5.80 | 6.00 |
| Dispersing agent A (BYK-W-996) | 4.40 | 4.40 | 4.60 | 4.80 |
| Flame retardant A (Antiblaze DMMP) | 5.60 | 5.60 | 4.60 | 9.00 |
| Initiator A (TRIG. BPIC-C75) | 1.10 | 1.10 | 1.20 | 1.20 |
| Initiator B (TRIG.21OP50) | 0.40 | 0.40 | 0.30 | 0.40 |
| Inhibitor A (IN-9073) | 0.20 | 0.20 | 0.20 | 0.20 |
| Mold release agent (NORAC COAD 27D ZNST) | 5.60 | 5.60 | 5.80 | 6.00 |
| Colorant A (11-81521 [Grey]) | 8.30 | | 8.70 | 9.00 |

TABLE 3-continued

| | Example | | | |
|---|---|---|---|---|
| | 9 | 10 | 11 | 12 |
| Flame retardant B (Martinal ON-921 ATH Albemarle) | 302.00 | 311.00 | 320.00 | 329.00 |
| Solid glass spheres (3000 CP-01 SPHERIGLASS) | | | | |
| Thickener A (PG-91146) | 5.60 | 5.60 | 5.80 | 6.00 |
| Thickener B (AM-9033) | | | | |
| Glass fibers (P-973CAB-113) | 122.20 | 122.20 | 127.50 | 131.30 |
| Total | 555.40 | 566.10 | 578.70 | 596.90 |

TABLE 4

| | Example | | | |
|---|---|---|---|---|
| | 13 | 14 | 15 | 16 |
| Resin D (31009 [44314/ATLAC 490INT]) | | | | 74.30 |
| Resin A S903 | 53.40 | 72.00 | 74.30 | |
| Resin C (31-615-20-X) | | | | |
| Styrene monomer (R-152) | | | | |
| Resin B (Q-8000) | 35.60 | 16.70 | 17.10 | 17.10 |
| Monomer A (ROCRYL 400 [HEMA]) | 11.00 | 11.10 | 8.60 | 8.60 |
| Dispersing agent A (BYK-W-996) | 4.00 | 4.40 | 4.60 | 4.60 |
| Flame retardant A (Antiblaze DMMP) | | | | |
| Initiator A (TRIG. BPIC-C75) | 1.10 | 1.30 | 1.30 | 1.40 |
| Inhibitor B (IN-91029) | | .60 | | |
| Initiator B (TRIG.21OP50) | 0.30 | | | |
| Inhibitor A (IN-9073) | 0.20 | | 0.20 | 0.20 |
| Mold release agent A (NORAC COAD 27D ZNST) | 5.50 | 5.60 | 5.70 | 5.70 |
| Colorant (11-81521 [Grey]) | 8.20 | | 8.60 | 8.60 |
| Flame retardant B (Martinal ON-921 ATH Albemarle) | 302.00 | 317.00 | 321.00 | 320.00 |
| Solid glass spheres (3000 CP-01 SPHERIGLASS) | | | | |
| Thickener A (PG-91146) | 5.50 | 4.40 | | 5.10 |
| Thickener B (AM-9033) | | | 4.60 | |
| Glass fibers (P-973CAB-113) | 121.00 | 122.00 | 125.70 | 125.70 |
| Total | 547.80 | 555.10 | 571.70 | 571.30 |

TABLE 5

| | Example | | |
|---|---|---|---|
| | 17 | 18 | 19 |
| Resin E (S988-500) | | | 45.60 |
| Resin A (S903) | 73.50 | 76.50 | 45.60 |
| Resin C (31-615-20-X) | | | |
| Styrene monomer (R-152) | 17.70 | 17.70 | |
| Resin B (Q-8000) | | | |
| Monomer A (ROCRYL 400 [HEMA] | 8.80 | 5.80 | 8.80 |
| Dispersing agent A (BYK-W-996) | 4.70 | 3.50 | 4.70 |
| Flame retardant A (Antiblaze DMMP) | 11.80 | 11.80 | 11.80 |
| Initiator A (TRIG. BPIC-C75) | 1.50 | 1.50 | 1.20 |
| Inhibitor B (IN-91029) | | | |
| Initiator B (TRIG.21OP50) | | | 0.50 |
| Inhibitor A (IN-9073) | 0.20 | 0.20 | 0.20 |
| Mold release agent A (NORAC COAD 27D ZNST) | 5.90 | 5.80 | 5.90 |
| Colorant A (11-81521 [Grey]) | 8.80 | 8.80 | |
| Rheological additive A (GARAMITE 1210) | | 0.50 | |

TABLE 5-continued

| | Example | | |
|---|---|---|---|
| | 17 | 18 | 19 |
| Flame retardant B (Martinal ON-921 ATH Albemarle) | 321.00 | 326.70 | 327.00 |
| Solid glass spheres (3000 CP-01 SPHERIGLASS) | | | |
| Thickener A (PG-91146) | 4.70 | | |
| Thickener B (AM-9033) | | 2.60 | 1.80 |
| Glass fibers (P-973CAB-113) | 129.40 | 129.40 | 129.40 |
| Total | 588.00 | 590.80 | 588.40 |

TABLE 6

| | Example | | | |
|---|---|---|---|---|
| | 20 | 21 | 22 | 23 |
| Low profile additive A (FN-510) | | | | 11.40 |
| Resin A (S903) | 71.40 | | | 91.40 |
| Resin C (31-615-20-X) | | 73.50 | 71.40 | |
| Low profile additive B (N-700) | | | | 17.20 |
| Styrene monomer (R-152) | | | | |
| Resin B (Q-8000) | 17.20 | 17.70 | | |
| Monomer A (ROCRYL 400 [HEMA] | 11.40 | 8.80 | 11.40 | 8.60 |
| Dispersing agent A (BYK-W-996) | | | | 4.60 |
| Flame retardant A (Antiblaze DMMP) | 11.40 | 14.70 | 11.40 | |
| Initiator A (TRIG. BPIC-C750 | 1.10 | 1.20 | 1.10 | 1.10 |
| Initiator B (IN-910290) | | | | |
| Inhibitor B (TRIG.21OP50) | 0.50 | 0.50 | 0.50 | 0.50 |
| Inhibitor A (IN-9073) | 0.20 | 0.20 | 0.20 | 0.20 |
| Mold release agent (NORAC COAD 27D ZNST) | 5.70 | 5.90 | 5.70 | 5.70 |
| Colorant (11-81521 [Grey]) | 8.60 | 8.80 | 8.60 | 8.60 |
| Rheological additive A (GARAMITE 1210) | | | | |
| Flame retardant B (Martinal ON-921 ATH Albemarle) | 315.00 | 325.00 | 315.00 | 310.00 |
| Solid glass sphere (3000 CP-01 SPHERIGLASS) | | | | |
| Thickener A (PG-91146) | | | | |
| Thickener B (AM-9033) | 3.40 | 2.90 | 2.90 | 3.10 |
| Glass fibers (P-973CAB-113) | 125.70 | 129.40 | 125.70 | 125.70 |
| Total | 571.60 | 588.60 | 571.10 | 574.00 |

TABLE 7

| | Example | | | |
|---|---|---|---|---|
| | 24 | 25 | 26 | 27 |
| Resin A (S903) | 52.26 | 52.50 | 52.50 | 52.50 |
| Resin B (Q-8000) | 34.84 | 35.00 | 35.00 | 35.00 |
| Monomer A (ROCRYL 400 [HEMA]) | 12.90 | 12.50 | 12.50 | 12.50 |
| Dispersing agent A (BYK-W-996) | 5.48 | 5.31 | 5.31 | 5.31 |
| Initiator A (TRIG. BPIC-C75) | 1.23 | 1.19 | 1.19 | 1.19 |
| Initiator B (TRIG.21OP50) | 0.26 | 0.25 | 0.25 | 0.25 |
| Inhibitor A (IN-9073) | 0.20 | 1.44 | 1.44 | 1.44 |
| Mold release agent A (NORAC COAD 27D ZNST) | 6.45 | 6.25 | 6.25 | 6.25 |
| Colorant A (11-81521 [Grey]) | 9.68 | 9.38 | 9.38 | 9.38 |
| Flame retardant B (Martinal ON-921 ATH Albemarle) | 359.61 | 355.56 | 354.31 | 353.06 |
| IONPURE wpa <50 | 12.90 | 1.88 | 3.12 | 4.38 |
| Thickener A (PG-91146) | 6.13 | 6.25 | 6.25 | 6.25 |
| Glass fibers (P-973CAB-113) | 142.00 | 137.50 | 137.50 | 137.50 |
| Total | 6.45.22 | 625.01 | 625.00 | 625.01 |

TABLE 8

| | Example | | | |
|---|---|---|---|---|
| | 28 | 29 | 30 | 31 |
| Resin F (31610) | 72.56 | 72.56 | 72.56 | 73.72 |
| R-100 (styrene solution) | 17.98 | 17.98 | 17.98 | 18.27 |
| Styrene monomer | 9.46 | 9.46 | 9.46 | 8.01 |
| Low profile additive A | 1.58 | 1.58 | 1.58 | 1.60 |
| Initiator A (TRIG. BPIC-C75) | 0.79 | 0.79 | 0.79 | 0.80 |
| Initiator B (TRIG.21OP50) | 0.35 | 0.35 | 0.35 | 0.35 |
| Inhibitor A (IN-9073) | 0.09 | 0.09 | 0.09 | 0.10 |
| Mold release agent A (NORAC COAD 27D ZNST) | 3.15 | 3.15 | 3.15 | 3.21 |
| IONPURE wpa <50 | 0.95 | 1.58 | 2.21 | 6.41 |
| SB 222 (alumina trihydrate) | 94.19 | 93.56 | 92.93 | 91.9 |
| SB 432 (alumina trihydrate) | 31.55 | 31.55 | 31.55 | 32.05 |
| Sb203 [antimony trioxide] | 3.94 | 1.25 | 3.94 | 4.01 |
| FR-1210 DBDPO | | 7.89 | | |
| Thickener B (AM-9033) | 1.58 | 1.58 | 1.58 | 1.60 |
| Glass fibers (5509 [16 micron]) | 69.4 | 69.40 | 69.40 | 70.51 |
| Total | 315.46 | 315.46 | 315.46 | 237.84 |

Flat panels of 24" by 36" by 0.100" thick were molded as described above using the compound of example 13. These panels were supplied to an independent testing laboratory which tested the samples in accordance with UL 723 Class I. The compound was found to meet the 25/50 criteria. In addition, flat panels were made using the same recipe by at the following levels of Flame Retardant B, 300, 350 and 380. These samples were sent to Underwriters Laboratories in Chicago for testing in accordance with UL 723.

While in accordance with the Patent Statutes, the best mode and preferred embodiment have been set forth, the scope of the invention is not limited thereto, but rather by the scope of the attached claims.

What is claimed is:

1. A component for an air handler or hot air furnace which is a molded product of a molding composition comprising:
   a) a thermoset resin system comprising an unsaturated polyester prepolymer and a reactive monomer;
      wherein the unsaturated polyester has a weight average molecular weight from 200 to 5,000 and a glass transition temperature of 150° C. to 175° C.; wherein the unsaturated polyester prepolymer is dissolved in the reactive monomer; wherein the unsaturated polyester prepolymer is a product of a condensation polymerization reaction between a polyol and an acid, anhydride, acid dimer, or anhydride dimer;
      wherein the polyol is selected from the group consisting of ethylene glycol, propylene glycol, neopentyl glycol, diethylene glycol, dipropyleneglycol, trimethylpentanediol, cyclohexane diol, propoxylated bisphenol A, hydrogenated bisphenol A, and combinations thereof; wherein the acid, anhydride, acid dimer, or anhydride dimer is selected from the group consisting of phthalic anhydride, maleic anhydride, adipic acid, isophthalic acid, orthophthalic acid, terephthalic acid, fumaric acid, glutaric acid, azelaic acid, endomethylenetetrahydrophthalic anhydride, and combinations thereof;
      wherein the reactive monomer comprises hydroxyethyl methacrylate, and optionally a monomer selected from the group consisting of styrene, α-methyl styrene, vinyl toluene, divinyl benzene, diallylphthalate, methyl methacrylate, and combinations thereof;
      wherein the unsaturated polyester prepolymer is crosslinked during molding with a low profile additive selected from the group consisting of polymethylmethacrylate, polyethylmethacrylate, polystyrene, polystyrene copolymer, polyvinyl acetate, polyethylene, saturated polyester, vinyl chloride-vinyl-acetate copolymer, polyurethane, styrene butadiene copolymer, polycaprolactone, cellulose acetate butyrate, and combinations thereof;
b) from about 10% to about 30% by weight of glass fiber, based upon the total weight of the molding composition;
c) from 0.05% to 5% by weight of an initiator, based upon the total weight of the molding composition; and
d) from 250 to 450 pph of a flame retardant consisting of aluminum hydroxide, based on the weight of the thermoset resin system;

whereby the molding, composition when molded meets the standard of UL 723.

2. The component as set forth in claim 1, wherein the molding composition further comprises a thickening agent comprising magnesium oxide or magnesium hydroxide.

3. The component as set forth in claim 1, wherein the molding composition further comprises an antimicrobial agent.

4. The component as set forth in claim 1, wherein the low profile additive is a saturated polyester present in an amount of from about 35% to about 45% by weight of the thermoset resin system.

5. The component as set forth in claim 4, wherein said reactive monomer comprises hydroxyethyl methacrylate and styrene and wherein the molding composition comprises not more than 10% by weight of styrene, based on the weight of the molding composition.

6. The component as set forth in claim 1, wherein the glass fiber comprises from about 15% to about 25% by weight, based upon the total weight of the molding composition.

7. The component as set forth in claim 6, wherein the component is a drain pan, a base pan, or a blower housing.

8. A method of making a component for an air handler or hot air furnace comprising molding a housing from a molding composition, the molding composition comprising:
a) a thermoset resin system comprising: an unsaturated polyester prepolymer and a reactive monomer;
wherein the unsaturated polyester prepolymer has a weight average molecular weight of from 200 to 5,000 and a glass transition temperature of from 150° C. to 175° C.;
wherein the unsaturated polyester prepolymer is dissolved in the reactive monomer;
wherein the unsaturated polyester prepolymer is-a product of a condensation polymerization reaction between a polyol and an acid, anhydride, acid dimer or anhydride dimer;
where the polyol is selected from the group consisting of ethylene glycol, propylene glycol, neopentyl glycol, diethylene glycol, dipropylene glycol, trimethylpentanediol, cyclohexane diol, propoxylated bisphenol A, hydrogenated bisphenol A, and combinations thereof;
wherein the acid, anhydride, acid dimer or anhydride dimer is selected from the group consisting of phthalic anhydride, maleic anhydride, adipic acid, isophthalic acid, orthophthalic acid, terephthalic acid, fumaric acid, glutaric acid, azelaic acid, endomethylenetetrahydrophthalic anhydride, and combinations thereof;
wherein the reactive monomer comprises hydroxyethyl methacrylate, and optionally a monomer selected from the group consisting of styrene, α-methyl styrene, vinyl toluene, divinyl benzene, diallylphthalate, methyl methacrylate, and combinations thereof; and
wherein the unsaturated polyester prepolymer is cross-linked during molding with a low profile additive selected from the group consisting of polymethylmethacrylate, polyethylmethacrylate, polystyrene, polystyrene copolymer, polyvinyl acetate, polyethylene, saturated polyester, vinyl chloride-vinyl acetate copolymer, polyurethane, styrene butadiene copolymer, polycaprolactone, cellulose acetate butyrate and combinations thereof;
b) from about 10% to about 30% percent by weight of glass fiber, based upon the total weight of the molding composition;
c) an initiator; and
d) from 250 to 450 pph of a flame retardant comprising aluminum hydroxide, based on the weight of the thermoset resin system;

whereby the molding composition when molded meets the standard of UL 723.

9. The method of making a component as set forth in claim 8, wherein the reactive monomer comprises hydroxyethyl methacrylate and styrene or toluene and the low profile additive is a saturated polyester.

10. The method of making a component as set forth in claim 8, wherein the molding composition further comprises an antimicrobial agent.

11. A molding composition comprising:
a) a thermoset resin system comprises an unsaturated polyester prepolymer and a reactive monomer;
wherein the unsaturated polyester prepolymer has a weight average molecular weight of from 200 to 5,000 and a glass transition temperature of 150° C. to 175° C.;
wherein the unsaturated polyester prepolymer is dissolved in a reactive monomer;
wherein the unsaturated polyester prepolymer is a product of a condensation polymerization reaction between a polyol and an acid, anhydride, acid dimer or anhydride dimer;
where the polyol is selected from the group consisting of ethylene glycol, propylene glycol, neopentyl glycol, diethylene glycol, dipropylene glycol, trimethylpentanediol, cyclohexane diol, propoxylated bisphenol A, hydrogenated bisphenol A, and combinations thereof;
wherein the acid, anhydride, acid dimer or anhydride dimer is selected from the group consisting of phthalic anhydride, maleic anhydride, adipic acid, isophthalic acid, orthophthalic acid, terephthalic acid, fumaric acid, glutaric acid, azelaic acid, endomethylenetetrahydrophthalic anhydride, and combinations thereof;
wherein the reactive monomer comprises hydroxyethyl methacrylate, and optionally a monomer selected from the group consisting of styrene, α-methyl styrene, vinyl toluene, divinyl benzene, diallylphthalate, methyl methacrylate, and combinations thereof; and
wherein the unsaturated polyester prepolymer is cross-linked during molding with a low profile additive selected from the group consisting of polymethylmethacrylate, polyethylmethacrylate, polystyrene, polystyrene copolymer, polyvinyl acetate, polyethylene, saturated polyester, vinyl chloride-vinyl acetate copolymer, polyurethane, styrene butadiene copolymer, polycaprolactone, cellulose acetate butyrate and combinations thereof;
b) from about 10% to about 30% percent by weight of glass fiber, based upon the total weight of the molding composition;

c) an initiator; and
d) from 250 to 450 pph of a flame retardant comprising aluminum hydroxide, based on the weight of the thermoset resin system;

whereby the molding composition when molded meets the standard of UL 723.

12. The molding composition as set forth in claim 11, wherein the reactive monomer comprises hydroxyethyl methacrylate and styrene or toluene and the low profile additive is a saturated polyester.

13. The molding composition as set forth in claim 11, wherein the amount of glass fiber is from about 15% to about 25% weight, based upon the total weight of the molding composition.

14. The molding composition as set forth in claim 11, further comprises an antimicrobial agent.

* * * * *